(12) United States Patent
Milam et al.

(10) Patent No.: US 9,389,748 B2
(45) Date of Patent: *Jul. 12, 2016

(54) VISUAL DOMAIN NAVIGATION

(71) Applicant: INTERNATIONAL BUSINESS MACHINES CORPORATION, Armonk, NY (US)

(72) Inventors: Jennifer L. Milam, Austin, TX (US); Eric W. Leong, Austin, TX (US); Pamela A. Nesbitt, Austin, TX (US); Jonathan W. Stoecker, Austin, TX (US); Tricia Y. Garrett, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 228 days.

This patent is subject to a terminal disclaimer.

(21) Appl. No.: 14/015,856

(22) Filed: Aug. 30, 2013

(65) Prior Publication Data

US 2015/0067587 A1 Mar. 5, 2015

(51) Int. Cl.
*G09G 5/00* (2006.01)
*G06F 3/0481* (2013.01)
*G06F 3/0484* (2013.01)

(52) U.S. Cl.
CPC ............ *G06F 3/0481* (2013.01); *G06F 3/0484* (2013.01); *G06F 3/04817* (2013.01)

(58) Field of Classification Search
None
See application file for complete search history.

(56) References Cited

U.S. PATENT DOCUMENTS

| 8,635,547 B2 * | 1/2014 | Otsuka | G06F 3/0482 715/768 |
| 2006/0059437 A1 * | 3/2006 | Conklin, III | G06F 3/0481 715/800 |
| 2010/0275122 A1 * | 10/2010 | Buxton | G06F 3/0488 715/728 |
| 2013/0147834 A1 * | 6/2013 | Yoshimoto | G01C 21/367 345/629 |

OTHER PUBLICATIONS

Stone et al., "The movable filter as a user interface tool", 1994, ACM, URL: http://dl.acm.org/citation.cfm?id=191774.*
Stone et al., "Toolglass and magic lenses: the see-through interface", ACM, URL: http://dl.acm.org/citation.cfm?id=166126.*

* cited by examiner

*Primary Examiner* — David H Chu
(74) *Attorney, Agent, or Firm* — Eustace P. Isidore; Yudell Isidore PLLC

(57) ABSTRACT

A method, a system and a computer program product for visually navigating contextual semantic data in a graphical overlay. The method includes overlaying a first lens, corresponding to a first domain and oriented in a first position, on the graphical overlay. A set of semantic data is displayed within the first lens. Rotation of the first lens to a second position reconfigures the semantic data such that a modified set of semantic data is displayed within the first lens. The modified semantic data and a ghosted image of the set of semantic data may be simultaneously displayed. A rotational position of the first lens is associated with various context aspects. A second lens, corresponding to a second domain, fully overlaps the first lens. Responsive to separating the first and second lenses, a circumscribed region is preserved within each of the first and second lenses while concealing a non-circumscribed region.

20 Claims, 11 Drawing Sheets

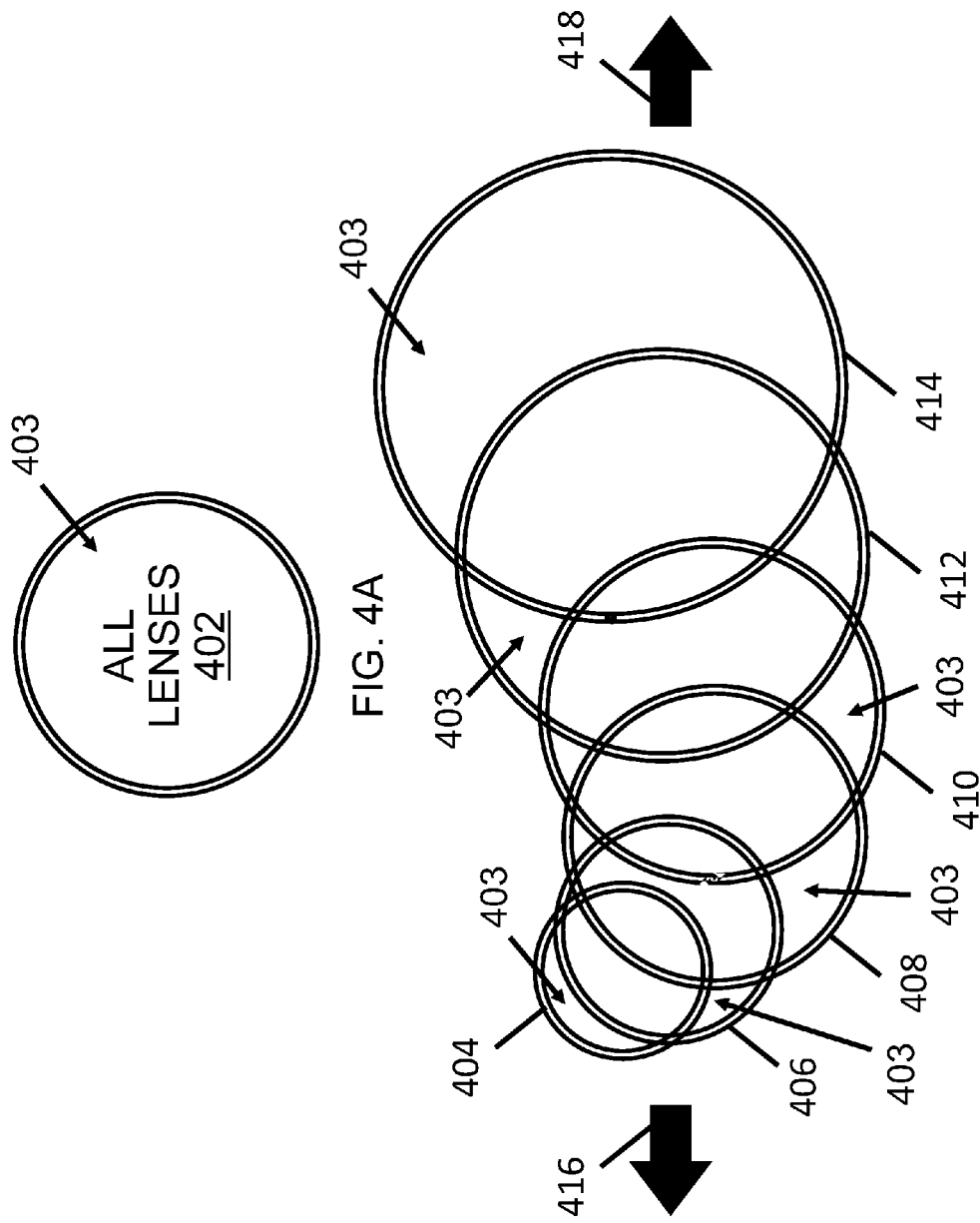

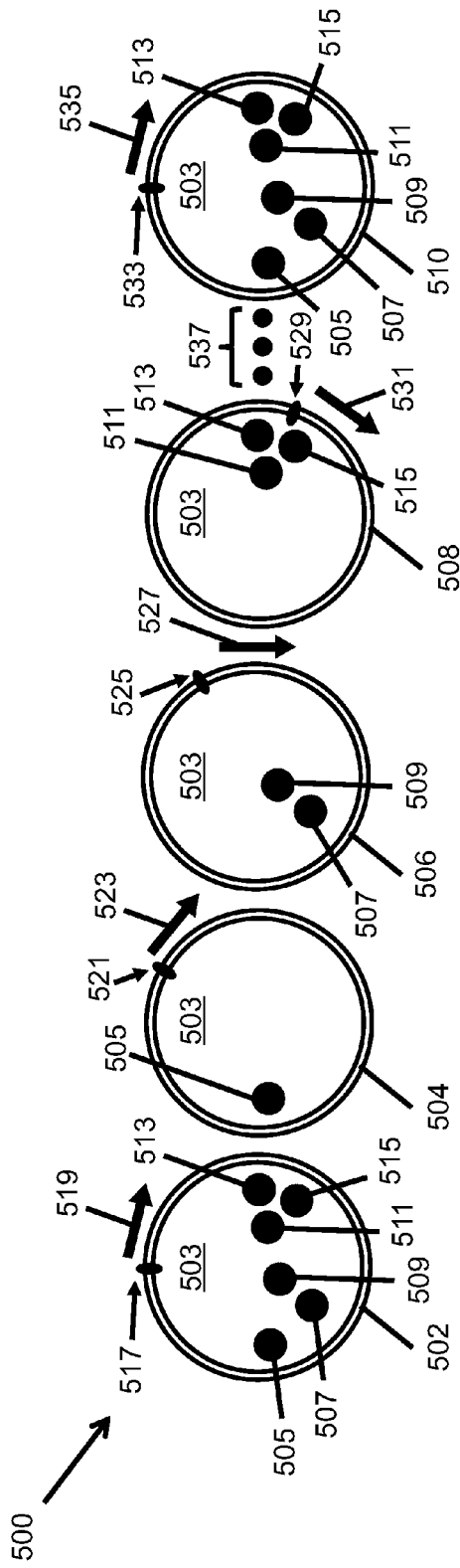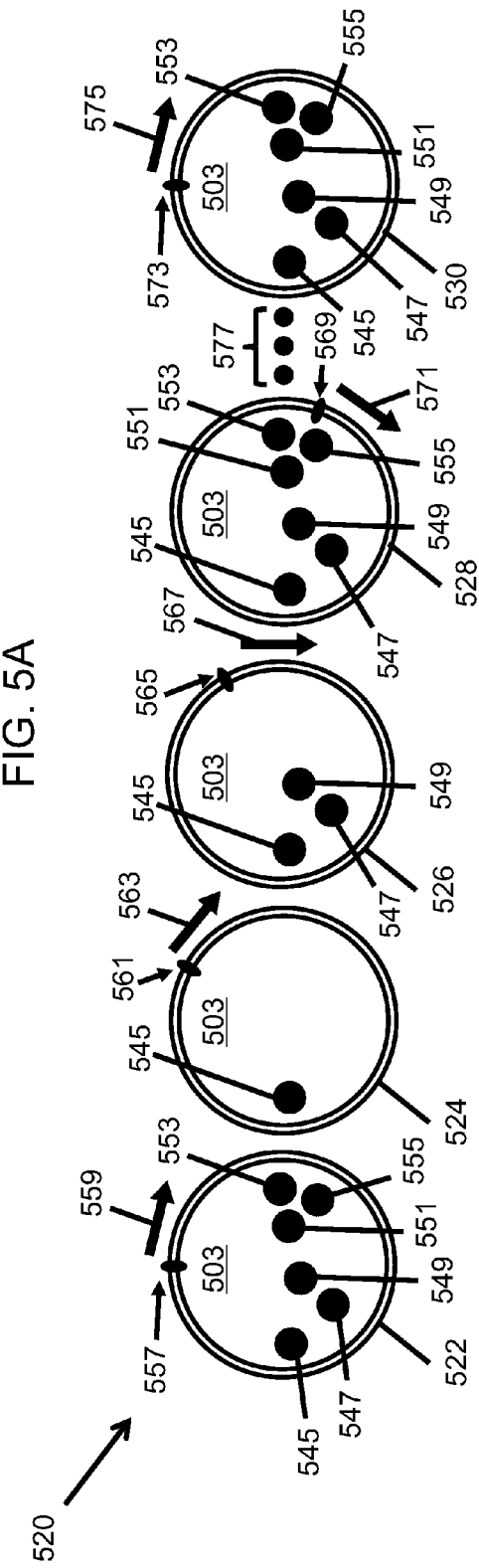
FIG. 5A
FIG. 5B

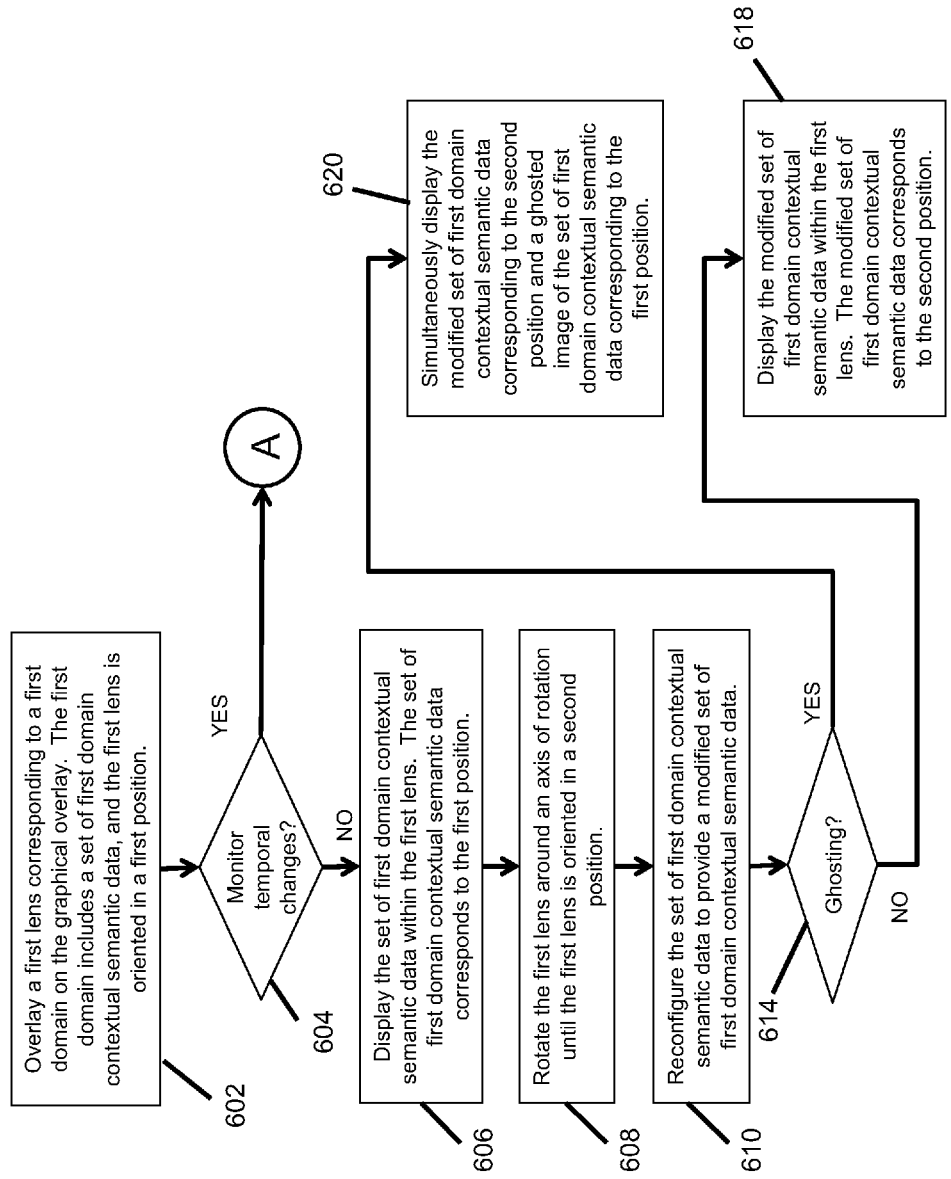

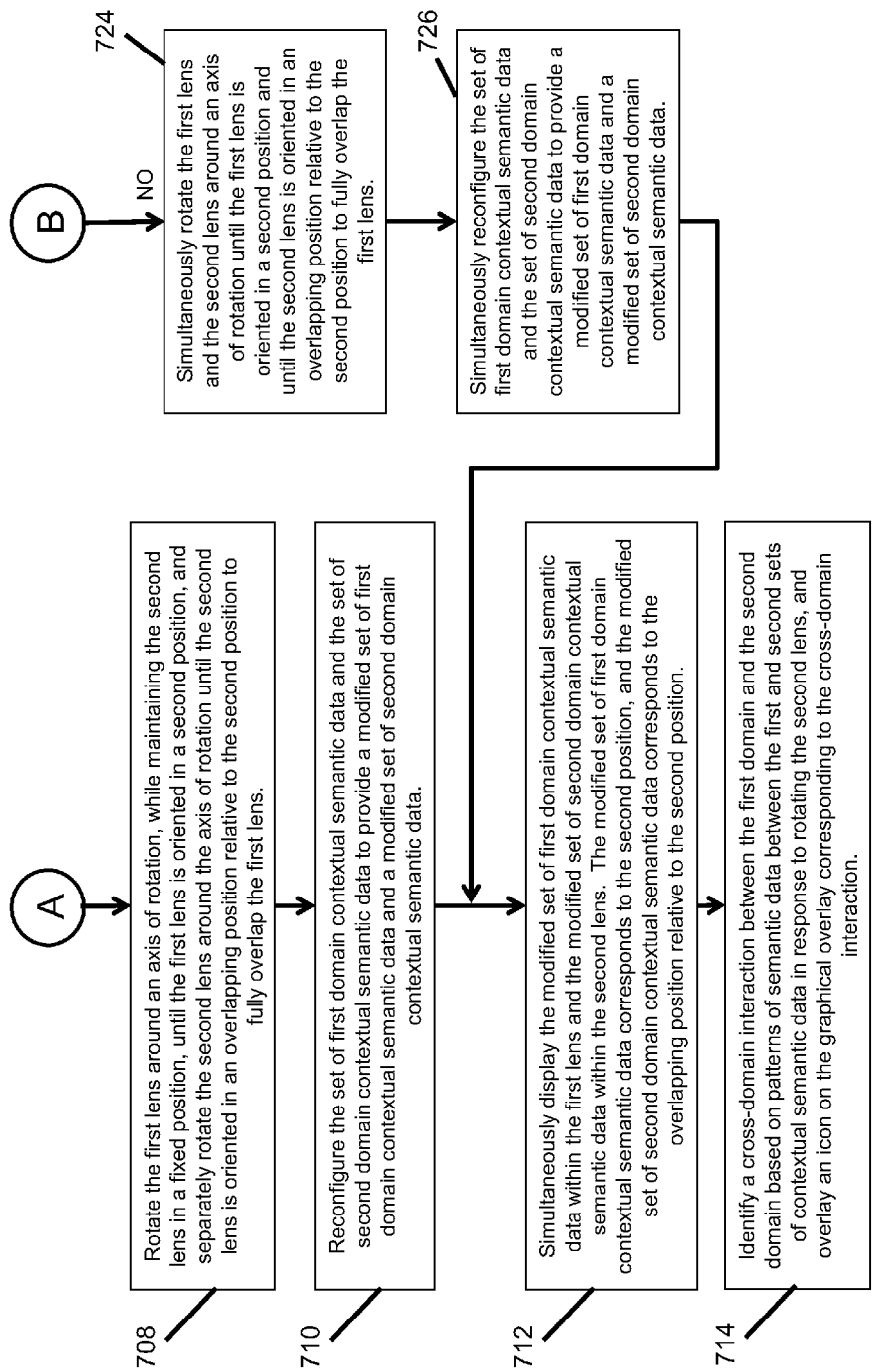

VISUAL DOMAIN NAVIGATION

CROSS REFERENCE TO RELATED APPLICATIONS

The present disclosure is related to the subject matter of commonly assigned, co-pending application Ser. No. 14/015,767 and co-pending application Ser. No. 14/015,856, filed on even date herewith.

BACKGROUND

1. Technical Field

The present disclosure generally relates to computer systems and in particular to computer-implemented methods of visualizing navigating semantic data.

2. Description of the Related Art

The management and operation of cities and/or enterprises is a challenging task, particularly with the ever-increasing size and number of entities within them. In order to make well-informed decisions regarding city and/or enterprise operations, information and data related to relationships between and among entities, such as buildings, equipment, etc., and other information such as maintenance history and schedules, must be available and understood. Navigating through such large amounts of different types of data and information can be quite difficult. While semantic models have been used to describe linkages between and among different sets of data across various entities, for example across various domains which include one or more contexts, users often need ways to investigate such complex and layered datasets as a function of space, time, and domain. Currently, users may navigate through space by use of map-based metaphors, whereby a user moves a mouse across a graphical map (e.g., by a mouse click and drag). Users may navigate time via structured queries, visual time sequences, etc. Domains may be navigated by opening different context windows and/or by creating complex queries (e.g., structured query language (SQL) queries).

BRIEF SUMMARY

Disclosed are a method, a system and a computer program product for visually navigating contextual semantic data in a graphical overlay.

The method includes overlaying a first lens on the graphical overlay, where the first lens circumscribes a first region of the graphical overlay. The first lens, which corresponds to a first domain, includes a set of first domain contextual semantic data and is oriented in a first position. The set of first domain contextual semantic data, which corresponds to the first position, is displayed within the first lens. The first lens is rotated around an axis of rotation until the first lens is oriented in a second position. In response to rotating the first lens around the axis of rotation, the set of first domain contextual semantic data is reconfigured to provide a modified set of first domain contextual semantic data. The modified set of first domain contextual semantic data, which corresponds to the second position, is displayed within the first lens. In some cases, while the first lens is oriented in the second position, the modified set of first domain contextual semantic data and a ghosted image of the original set of first domain contextual semantic data are simultaneously displayed. A rotation position of the first lens may be associated with specific points in time, for example, where the first position corresponds to a first point in time and the second position corresponds to a second point in time occurring before or after the first point in time. Thus, an earlier-in-time or later-in-time version of the set of first domain contextual semantic data corresponding to the second position may include historical/projected data. A second lens, which corresponds to a second domain, and includes a set of second domain contextual semantic data may also be overlaid on the graphical display. The second lens is oriented in an overlapping position relative to the first position to fully overlap the first lens and circumscribe the first region of the graphical overlay. The set of second domain contextual semantic data, which corresponds to the overlapping position relative to the first position, is displayed within the second lens. Rotation of the second lens to an overlapping position relative to the second position may result in simultaneous display of a reconfigured set of second domain contextual semantic data and a ghosted image of the original set of second domain contextual semantic data. In some cases, the first and second lenses are rotated simultaneously, while in other cases the first and second lenses are rotated separately. A cross-domain interaction between the first and second domain based on patterns of semantic data between the first and second sets of contextual semantic data may also be identified, and an icon corresponding to the cross-domain interaction may be displayed on the graphical overlay. Further, in response to separating the first and second lenses such that they are in one of a partially overlapping and a non-overlapping spatial relationship, the first circumscribed region may be simultaneously preserved within each of the first and second lenses while concealing a second non-circumscribed region.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIGS. 4A-4B are schematic diagrams illustrating a method for inspecting a fixed region of a graphical overlay across a plurality of domains, in accordance with one embodiment;

FIGS. 5A-5C are schematic diagrams illustrating a method for visually navigating contextual semantic data within a fixed region of a graphical overlay across a plurality of domains, in accordance with various embodiments;

FIGS. 6A-6B are flow charts illustrating a method for visually navigating contextual semantic data in a lens in accordance with one embodiment;

FIGS. 7A-7B is a flow chart illustrating a method for visually navigating contextual semantic data in a plurality of lenses in accordance with one embodiment.

DETAILED DESCRIPTION

Figure 1:
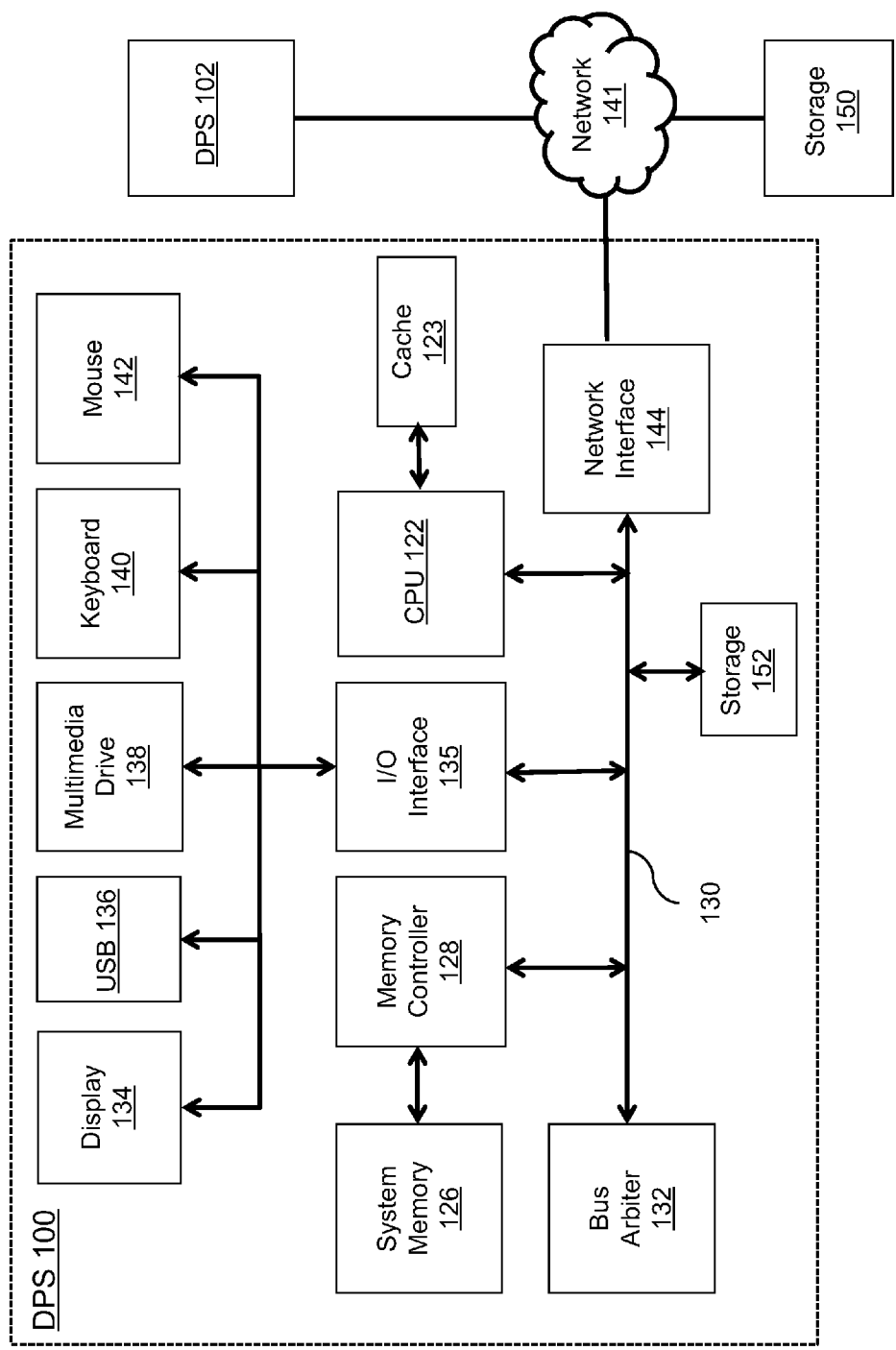
FIG. 1 provides a block diagram representation of an example data processing system within which the disclosure can be practiced, according to one embodiment.

The illustrative embodiments provide a method, system, and computer program product for visually navigating contextual semantic data in a graphical overlay. A first lens, oriented in a first position and corresponding to a first domain, is overlaid on the graphical overlay. A set of first domain contextual semantic data is displayed within the first lens. Rotation of the first lens around an axis of rotation to a second position results in reconfiguring the set of first domain contextual semantic data such that a modified set of first domain contextual semantic data is displayed within the first lens. While the first lens is oriented in the second position, the modified set of first domain contextual semantic data and a ghosted image of the original set of first domain contextual semantic data may be simultaneously displayed. A rotational position of the first lens may be associated with specific points in time, such that rotation of the first lens includes displaying historical/projected data. A second lens, corresponding to a second domain, may also be overlaid on the graphical display such that the second lens is oriented in an overlapping position relative to the first position to fully overlap the first lens. A set of second domain contextual semantic data is displayed within the second lens. In some embodiments, the first and second lenses are rotated simultaneously, while in other embodiments the first and second lenses are rotated separately A cross-domain interaction between the first and second domains based on patterns of semantic data between the first and second sets of contextual semantic data may also be identified, and an icon corresponding to the cross-domain interaction is displayed on the graphical overlay. Responsive to separation of the first and second lenses, a first circumscribed region is simultaneously preserved within each of the first and second lenses while concealing a second non-circumscribed region.

In the following detailed description of exemplary embodiments of the disclosure, specific exemplary embodiments in which the disclosure may be practiced are described in sufficient detail to enable those skilled in the art to practice the disclosure, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

In the following detailed description, numerous specific details such as specific method orders, structures, elements, and connections have been set forth. It is to be understood however that these and other specific details need not be utilized to practice embodiments of the present disclosure. In other circumstances, well-known structures, elements, or connections have been omitted, or have not been described in particular detail in order to avoid unnecessarily obscuring this description.

References within the specification to "one embodiment," "an embodiment," or "embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It is understood that the use of specific component, device and/or parameter names (such as those of the executing utility/logic described herein) are for example only and not meant to imply any limitations on the disclosure. The disclosure may thus be implemented with different nomenclature/terminology utilized to describe the components/devices/parameters herein, without limitation. Each term utilized herein is to be given its broadest interpretation given the context in which that terms is utilized.

Those of ordinary skill in the art will appreciate that the hardware components and basic configuration depicted in the presented figures may vary. For example, the illustrative components within the data processing system (DPS 100, FIG. 1) are not intended to be exhaustive, but rather are representative to highlight essential components that are utilized to implement the present disclosure. For example, other devices/components may be used in addition to or in place of the hardware depicted. The depicted example is not meant to imply architectural or other limitations with respect to the presently described embodiments and/or the general disclosure. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

With reference now to the figures, and beginning with FIG. 1, there is depicted a block diagram representation of an example data processing system (DPS), as utilized within one embodiment. The data processing system is described as having features common to a server computer. However, as used herein, the term "data processing system," is intended to include any type of computing device or machine that is capable of receiving, storing and running a software product including not only computer systems, but also devices such as communication devices (e.g., routers, switches, pagers, telephones, electronic books, electronic magazines and newspapers, etc.) and personal and home consumer devices (e.g., handheld computers, Web-enabled televisions, home automation systems, multimedia viewing systems, etc.).

FIG. 1 and the following discussion are intended to provide a brief, general description of an exemplary data processing system adapted to implement the described embodiments. While embodiments will be described in the general context of instructions residing on hardware within a data processing system, those skilled in the art will recognize that embodiments may be implemented in a combination of program modules running in an operating system. Generally, program modules include routines, programs, components, and data structures, which perform particular tasks or implement particular abstract data types. The described features of the disclosure may also be practiced in distributed computing environments where tasks are performed by remote processing devices that are linked through a communications network. In a distributed computing environment, program modules may be located in both local and remote memory storage devices.

A DPS, such as DPS 100, can include at least one processing unit (CPU) 122, a system memory 126 coupled to a memory controller 128, and a system interconnect fabric 130 that couples memory controller 128 to CPU 122 and other components of DPS 100. System interconnect fabric 130 in an embodiment can be an address and data bus. Commands on system interconnect fabric 130 are communicated to various system components under the control of bus arbiter 132.

DPS 100 can further include cache memory 123 for high speed storage of frequently used data. Cache memory 123 can be connected to or communicatively coupled with CPU 122. While cache memory 123 is shown operatively connected to CPU 122, cache memory 123 can also operatively be a part of system memory 126.

DPS 100 further includes computer readable storage media, such as one or more multimedia drives 138, including for example hard disk drives. Multimedia drives 138 provide non-volatile storage for DPS 100. DPS 100 also includes one or more user interface devices, which allow a user to provide input and receive output from DPS 100. For example, user interface devices can include displays 134, universal serial bus (USB) ports 136, keyboards 140, and pointing devices such as a mouse 142. Multimedia drives 138 and the various user interface devices can be communicatively coupled to system interconnect fabric 130 by an input-output (I/O) interface 135. Although the description of computer readable storage media above refers primarily to a hard disk, it should be appreciated by those skilled in the art that other types of media which are readable by a computer, such as removable magnetic disks, CD-ROM disks, magnetic cassettes, flash memory cards, digital video disks, Bernoulli cartridges, and other later-developed hardware, may also be used in the exemplary computer operating environment.

DPS 100 also comprises storage 152, within which data/instructions/code may be stored. Storage 152 is communicatively coupled to system interconnect fabric 130. In addition to the above described hardware components of DPS 100, various features of the disclosure are completed via software (or firmware) code or logic stored within system memory 126 or other storage (e.g., storage 152) and executed by CPU 122. In one embodiment, data/instructions/code from storage 152 populates the system memory 126, which is also coupled to system interconnect fabric 130 via the memory controller 128.

DPS 100 may also operate in a networked environment using logical connections to one or more remote computers or data processing systems, such as DPS 102. DPS 102 may be a computer, a server, a router or a peer device and typically includes many or all of the elements described relative to DPS 100. In a networked environment, program modules employed by DPS 100, or portions thereof, may be stored in a remote memory storage device 150. The logical connections depicted in FIG. 1 can include connections over a network 141. In an embodiment, network 141 may be a local area network (LAN). In alternative embodiments, network 141 may include a wide area network (WAN). DPS 100 is connected to network 141 through an input/output interface, such as a network interface 144. It will be appreciated that the network connections shown are exemplary and other means of establishing a communications link between the computers may be used.

Figure 2:
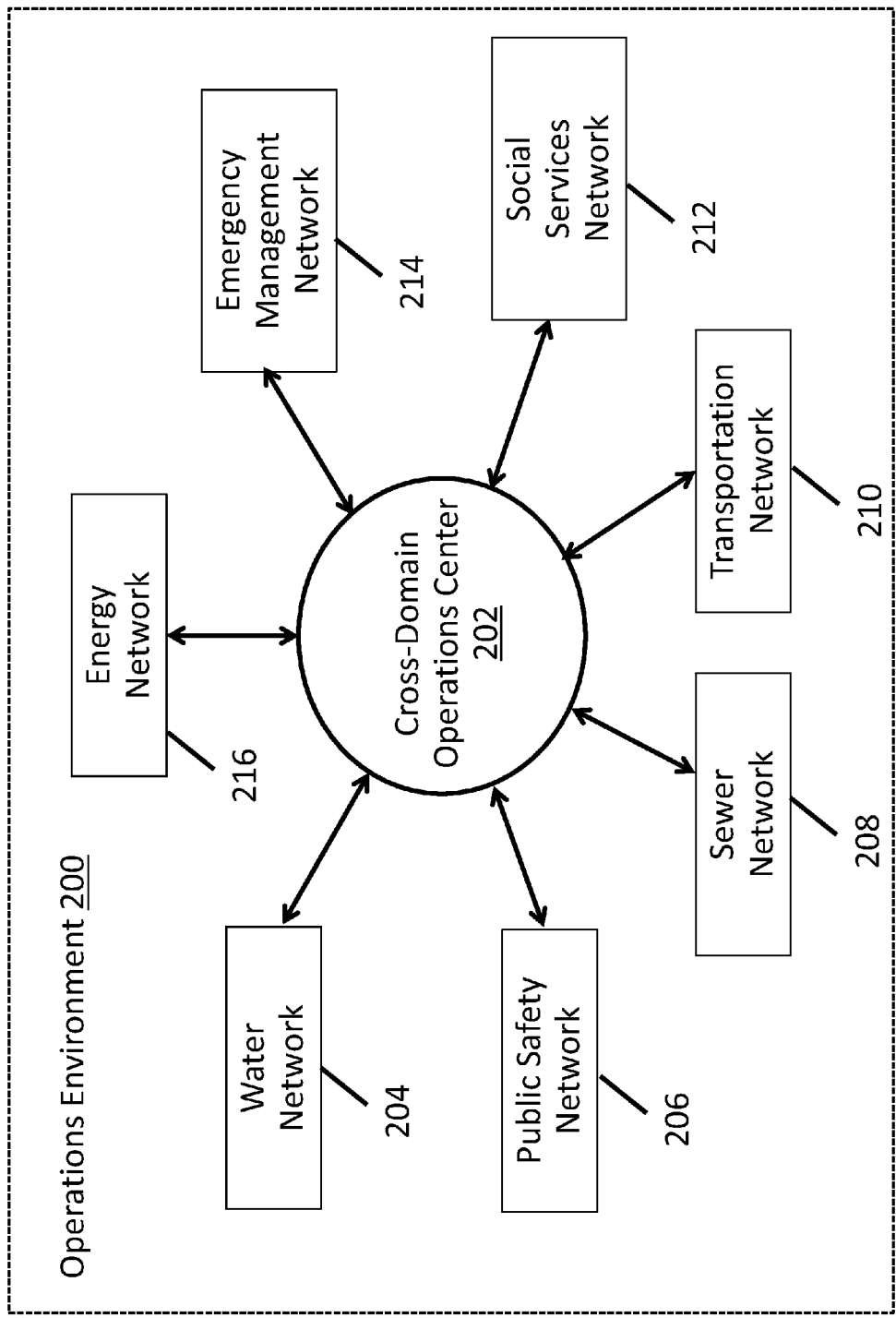
FIG. 2 illustrates a block diagram representation of an example operations environment in accordance with one embodiment.

FIG. 2 illustrates a block diagram representation of an example operations environment 200 in accordance with one embodiment. The operations environment 200, which may be for example a city, includes a plurality of domain-specific operations centers, illustrated in FIG. 2 as a water network 204, a public safety network 206, a sewer network 208, a transportation network 210, a social services network 212, an emergency management network 214, and an energy network 216. As used herein, the term "domain," is intended to identify all of the infrastructure, applications, and data related to a particular one of the networks identified by each of the plurality of domain-specific operations centers (i.e., water, public safety, sewer, transportation, social service, emergency management, and energy). Each of water network 204, public safety network 206, sewer network 208, transportation network 210, social services network 212, emergency management network 214, and energy network 216 are communicatively coupled to a cross-domain operations center 202. In practice, the cross-domain operations center 202 provides a holistic view of the operations environment 200 by serving as a centralized hub through which information is accessed and shared across each of the specific domains within the operations environment 200. Thus, data and information obtained from the various domains, as well as from other data sources, can be collectively analyzed and presented so as to enable well-informed decisions regarding the management and operations of domains within the operations environment 200.

To facilitate the collection and analysis of data/information from various sources, the illustrated operations environment 200 also includes domain-specific semantic models, which contain all the information related to a particular domain, including specifications, maintenance records/schedule, failure history, composition, and cost, among others. Moreover, in various embodiments, the operations environment 200 includes a reference semantic model which provides a linkage between/among the domain-specific semantic models (i.e., between/among multiple data sets), and can be used to model complex relationships between and among the various domain entities, for example in a city or enterprise, such as devices, equipment, buildings, infrastructure, etc. Thus, the reference semantic model can be used to model the relationship of such domain entities to one another and to other non-tangible items mentioned above such as maintenance records/schedule, failure history, composition, and cost, among others. By modeling these relationships and associations, specific interactions between and among domain entities may be better understood. Furthermore, in various embodiments, in addition to data obtained via one or more semantic models as mentioned above, data within the operations environment 200 may include data from one or more of a plurality of other data sources such as historical data, projected data, user inputted data, web content, streaming content, data obtained from a local database, and data obtained from a remote database, among others. However, navigating through such large amounts of different types of data and information can be quite difficult. Specifically, users often need ways to investigate complex and layered datasets as a function of space, time, and domain. Currently, users may navigate through space by use of map-based metaphors, whereby a user moves a mouse across a graphical map (e.g., by a mouse click and drag). Also, users may navigate time via structured queries, visual time sequences, etc. Domains may be navigated by opening different context windows and/or by creating complex queries (e.g., structured query language (SQL) queries). Thus, the present disclosure provides a solution that addresses a need for an intuitive way to rapidly visualize and comprehend complex, layered datasets by providing a method for visually navigating contextual semantic data in a graphical overlay.

Figure 3:
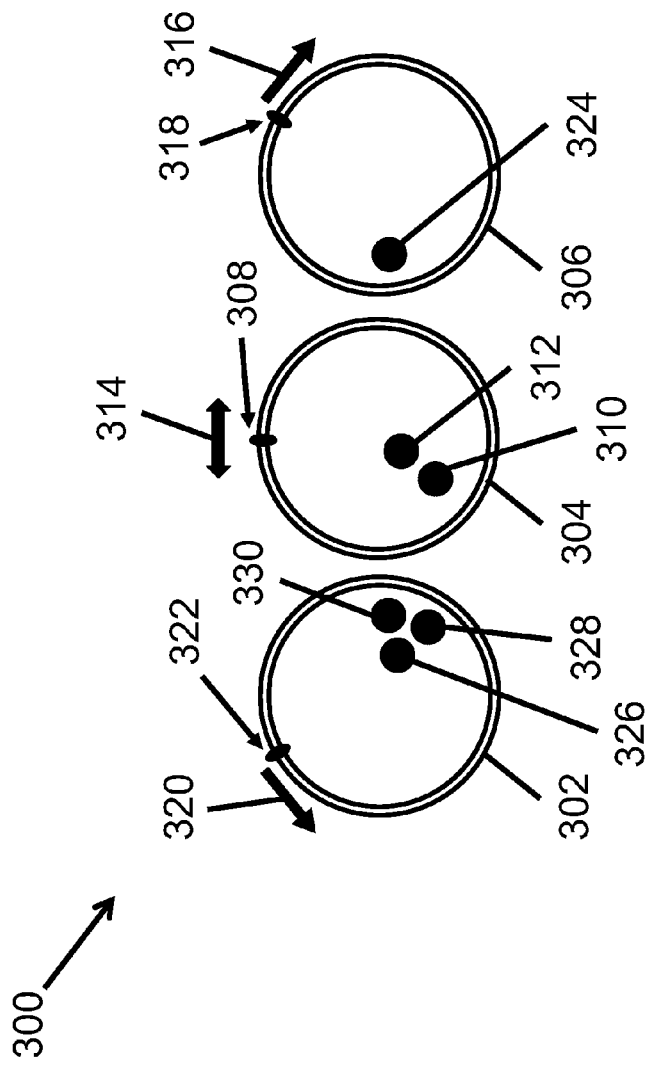
FIG. 3 is a schematic diagram illustrating a method for visually navigating contextual semantic data, according to one embodiment.

FIG. 3 is a schematic diagram illustrating a method 300 for visually navigating contextual semantic data in a lens 304 within a graphical overlay, according to one embodiment. Moreover, the embodiments discussed below with reference to FIGS. 3-5, can be accomplished in an operations environment, such as the operations environment 200 of FIG. 2. Further, the embodiments discussed herein can be used for various other applications including for example, visualization of social networks, internet of things, etc. Returning to FIG. 3, consider that the lens 304 is overlaid on a graphical overlay, which includes a spatial rendering of data including one of a geospatial map, a logical map, and a system map, in a first position indicated by bezel 308. The lens 304 may be rotated around an axis of rotation, for example by way of bezel 308, which, in some embodiments, can be moved by a mouse click/drag and/or by a touchscreen interface in an intuitive motion that simulates motion of a dial. As shown, the lens 304 may be rotated in one of a clockwise and counter-clockwise direction, as indicated by arrow 314. In some embodiments, the lens 304 is rotated in a clockwise direction, as represented by lens 306 and indicated by arrow 316, to another position indicated by bezel 318. In other embodiments, the lens 304 is rotated in a counter-clockwise direction, as represented by lens 302 and indicated by arrow 320, to another position indicated by bezel 322. Thus, as shown in FIG. 3, the lenses 302, 304, 306 all represent the same lens which has been oriented in different rotational positions. In some embodiments, the different rotational positions are associated with specific points in time. However, in other embodiments, the various rotational positions may have alternate associations, as discussed below.

In some embodiments, the lens 304, and thus lenses 302 and 306, correspond to a first domain and include a set of contextual semantic data. The first domain may include one of a plurality of domains accessible via the operations environment 200 (FIG. 2), such as a transportation network, a water management network, a healthcare network, a public safety network, an energy network, a fire network, a public services network, a sewer network, a social services network, an emergency management network, an environmental network, and a buildings network, as well as others not listed here. The choice of domains accessible via the operations environment 200 may be dependent on specific application needs, such as the needs and/or requirements of the specific city or enterprise within which one or more of the embodiments described herein is being deployed.

As used herein, the terms "context", "contextual", and "contextual semantic data" are used to identify data/information related to a particular part of a given domain. Additionally, a given context may include one or more individual aspects. The terms "aspect", "context aspect", and "aspect of a context" are used to describe various facets of a given context. These various facets of a context provide different perspectives from which to view the same context, as described in more detail below. Consider, for example, that lens 304, and thus lenses 302 and 306, correspond to a transportation domain. In various embodiments, a plurality of contexts related to a transportation domain may include road maintenance records/schedules, areas of traffic congestion, areas where traffic accidents have occurred, roadway costs, predicted traffic, and other alerts/warnings which may be defined by the operations environment 200 and/or by the user. The data corresponding to the various contexts listed above may include data from one or more of a plurality of data sources such as semantic model data, historical data, projected data, user inputted data, web content, streaming content, data obtained from a local database, and data obtained from a remote database, among others. Moreover, the above list of exemplary contexts is merely illustrative, and not meant to be limiting in any way. Those skilled in the art will recognize many other contexts which may be included within this list, as well as other contexts which may be included as parts of other domains.

Continuing with the example of a transportation domain, consider that a road maintenance records/schedules context has been activated within the lens 304, and thus also within lenses 302 and 306, which all represent the same lens which have been oriented in different rotational positions. As a result of activating the road maintenance records/schedules context, a set of first domain contextual semantic data is displayed within the lens 304, which is oriented in the first position, as represented by icons 310/312. In some embodiments, a rotational position may be associated with specific points in time, and the first position may correspond to a first point in time. Also, the set of first domain contextual semantic data represents the contextual semantic data at the first point in time. Thus, for example, the set of first domain contextual semantic data displayed within the lens 304 (represented by icons 310/312) may represent areas of roadway that are undergoing maintenance and/or repair within a current time-frame. As used herein, the term "current time-frame" may include the present time and/or a particular window of time (e.g., happening now, within the last 24 hours, etc.) that also includes the present time. The current time-frame may be pre-defined and/or be user-defined.

As discussed above, the lens 304 may be rotated in a clockwise direction, as represented by lens 306 and indicated by arrow 316, to a second position indicated by bezel 318. In embodiments where a rotational position is associated with specific points in time, the second position, indicated by bezel 318, may correspond to a second point in time occurring after the first point in time, indicated by bezel 308. Thus, rotation of the lens 304 in the clockwise direction results in retrieval of a corresponding later-in-time version of the set of first domain contextual semantic data, as represented by icon 324, where the later-in-time version of the set of first domain contextual semantic data is a projected dataset. Therefore, in some embodiments, the later-in-time version of the set of first domain contextual semantic data (i.e., the projected data) displayed within the lens 306 (represented by icon 324) represents areas of roadway that are scheduled to undergo maintenance and/or repair at a future time (i.e., after the current time-frame).

Similarly, the lens 304 may be rotated in a counter-clockwise direction, as represented by lens 302 and indicated by arrow 320, to a second position indicated by bezel 322. In embodiments where a rotational position is associated with specific points in time, the second position, indicated by bezel 322, may correspond to a second point in time occurring before the first point in time, indicated by bezel 308. Thus, rotation of the lens 304 in the counter-clockwise direction results in retrieval of a corresponding earlier-in-time version of the set of first domain contextual semantic data, as represented by icons 326/328/330, where the earlier-in-time version of the set of first domain contextual semantic data is a historical dataset. For example, in some embodiments, the earlier-in-time version of the set of first domain contextual semantic data (i.e., the historical data) displayed within the lens 302 (represented by icons 326/328/330) represents areas of roadway that have previously undergone maintenance and/or repair (i.e., before the current time-frame).

As discussed above, lens rotation results in reconfiguration of the contextual semantic data to provide a modified set of contextual semantic data (e.g., an earlier-in-time and/or laterin-time version of the contextual semantic data). Further, as used herein, reconfiguration of the contextual semantic data (e.g., by way of lens rotation) may be equivalently referred to as "cycling" of the contextual semantic data. Thus, as described herein, cycling of the contextual semantic data provides a valuable tool to improve trend analysis and anomaly detection, among others, by providing an intuitive interface and motion similar to that of a dial.

While FIG. 3 has been discussed with reference to a road maintenance records/schedules context of a transportation domain, the embodiments described may be similarly applied to different contexts, for example such as historical traffic, current traffic, and projected traffic, among others. Also, while the above discussion included examples where different rotational positions were associated with specific points in time (i.e., temporal context modification), other embodiments may prescribe alternative associations, and thus alternative context modifications, to the various rotational positions. For example, in some embodiments, rotation of one lens or a plurality of stacked lenses may result in modification of a visualized aspect of a context, where a particular context may include a plurality of individual aspects. As used herein, the terms "visualize" or "visualized" are used to define something (e.g., a given context, aspect of a context, contextual semantic data, etc.) that is visible within the graphical overlay. Also, as discussed above, the various aspects of a context provide different perspectives from which to view the same context. Consider, for example, a travel mode context of a transportation network which includes a plurality of aspects related to various modes of travel (e.g., bus, train, car, bike, etc.), where activation of an aspect corresponding to one of these modes of travel (e.g., bus, train, car, bike, etc.) may result in visualization of travel routes available for the particular mode of travel that is active. Thus, within a single travel mode context, in some embodiments, changing between the various travel mode aspects (e.g., bus, train, car, bike, etc.) would allow for alternately visualizing the various travel routes for each mode of travel. Similarly, a directions context of a transportation network may include various aspects related to different types of directions between two or more locations, such as for example, shortest distance, shortest time, avoid/follow major highways, avoid/follow toll roads, etc. Thus, within a single directions context, changing between the various aspects (e.g., distance, time, major highways, toll roads, etc.) would allow for alternatively visualized directions between two or more locations. As another example, consider a water and/or sewer network having one or more contexts that provide a host of different aspects, such as for visualizing potable water pipes, sewage pipes, pipes installed within various timeframes (e.g., the last 5 years, 10 years, 50 years, etc.), and pipes composed of various materials (e.g., plastic, metal, etc.). Thus, as described above, rotation of one lens or rotation of a plurality of stacked lenses may serve to visualize many different aspects of a particular space, such as for example, a given area of a geospatial map. Various other associations to the various rotational positions will be apparent to those skilled in the art, and the examples discussed herein are not meant to be limiting in any way.

FIG. 4 is a schematic diagram illustrating a method for inspecting a fixed region of a graphical overlay across a plurality of domains, in accordance with one embodiment. Specifically, FIG. 4A illustrates a plurality of lenses 402 stacked in a fully overlapping position. In various embodiments, the plurality of lenses 402 is overlaid on a specific region of the graphical overlay such that the plurality of lenses 402 circumscribes a region 403. In other embodiments, the plurality of lenses 402 may be moved to another position within the graphical overlay, such that the plurality of lenses circumscribes a different region, in order to facilitate rapid visualization of contextual semantic data along spatial axes. In some embodiments, each lens of the plurality of lenses 402 may correspond to a different domain, such as for example the domains shown in FIG. 2. The domains can include a water network 204, a public safety network 206, a sewer network 208, a transportation network 210, a social services network 212, an emergency management network 214, and an energy network 216, among others (see FIG. 2). Moreover, one or more contexts may be activated within each lens of the plurality of lenses 402, thus facilitating identification of cross-domain interactions based on visual patterns of semantic data displayed within the stacked plurality of lenses 402. In some embodiments, a default context for each lens is already active, thus no initial explicit context activation is necessary unless an alternative, non-default context, is required. Additionally, throughout the various embodiments described herein, one or more lenses can be activated by an external event trigger. Similarly, one or more domain contexts may be activated by an external event trigger such that an already active lens is populated with data and/or icons corresponding to the externally triggered domain context. Further, as a result of identifying such cross-domain interactions, well-informed decisions can be made regarding the management and operations of various domains within the operations environment (e.g., the operations environment 200).

FIG. 4B illustrates a method of separation of the plurality of lenses 402. Consider, by way of example, that a specific region of interest has been identified, such as the circumscribed region 403. In some embodiments, the circumscribed region 403 may be identified as a region of interest due to an identified cross-domain interaction within the stacked plurality of lenses 402. Thus, in various embodiments, it may be of interest to further investigate the circumscribed region 403 through inspection of a single domain (i.e., a single lens). In order to investigate the circumscribed region 403 through inspection of a single domain, the plurality of lenses 402 may be pulled apart (e.g., by a mouse click/drag and/or by a touchscreen interface), as indicated by arrows 416/418, to inspect each lens of the plurality of lenses 402 individually. As used herein, the terms "pull apart", "pulled apart", and/or "pulling apart" are equivalently used to imply that two or more of a plurality of lenses are separated. As a result of pulling apart the plurality of lenses 402, each lens of the plurality of lenses 402 becomes visible.

As shown in the example of FIG. 4B, the plurality of lenses includes lens 404, 406, 408, 410, 412, 414. Each of the separated plurality of lenses 404, 406, 408, 410, 412, 414 may be in a partially overlapping spatial relationship, as shown, or they may be in a non-overlapping spatial relationship. Moreover, the circumscribed region 403, which may represent a circumscribed region of a spatial rendering of data (i.e., geospatial, logical, or system map), is preserved within each of the plurality of lenses 404, 406, 408, 410, 412, 414. Preservation of the circumscribed region 403 within each of the plurality of lenses 404, 406, 408, 410, 412, 414 facilitates juxtaposition of the lenses for further inspection of individual domains within the fixed region defined by the circumscribed region 403. In some embodiments, pulling apart the plurality of lenses 402 further results in concealment of any regions of the graphical overlay that are not contained within the circumscribed region 403. For example, in embodiments where the graphical overlay includes a geospatial map, pulling apart the plurality of lenses 402 results in concealment of any portion of the geospatial map that is not within the circumscribed region 403. After pulling apart the plurality of lenses 402, cycling of the contextual semantic data may be done individually within each lens of the plurality of lenses 404, 406, 408, 410, 412, 414, as described above, in order to investigate the circumscribed region 403 through closer inspection by way of each of the single domains (i.e., single lenses) corresponding to each of the lenses 404, 406, 408, 410, 412, 414.

FIG. 5 (A-C) is a schematic diagram illustrating a method for visually navigating contextual semantic data within a fixed region of a graphical overlay across a plurality of domains, in accordance with various embodiments. Specifically, FIG. 5 shows methods 500, 520, 540 where a region of interest, such as circumscribed region 503, has been identified for further investigation through inspection of one or more domains, according to various embodiments.

FIG. 5A, showing method 500, illustrates cycling through contextual semantic data of individual lenses by lens rotation, such that lenses 502, 504, 506, 508, 510 represent a sequence of events occurring as a result of lens rotation. For example, a plurality of stacked lenses 502 (representing the stacking of lenses 504, 506, 508) includes a plurality of contextual semantic data 505, 507, 509, 511, 513, 515 corresponding to a plurality of domains associated with each of the stacked lenses 504, 506, 508. The plurality of stacked lenses 502 is oriented in a first position, as indicated by bezel 517. In some embodiments, the plurality of stacked lenses 502 is rotated (e.g., by way of bezel 517) in a direction indicated by arrow 519 to another position indicated by bezel 521 of lens 504. In some embodiments, rotation of the lenses results in concealment/revealing of one or more datasets of the plurality of contextual semantic data, which correspond to one or more lenses of the plurality of stacked lenses. Concealing or revealing data by lens rotation illustrates an example of cycling through the contextual semantic data. For example, rotation to the position indicated by bezel 521 results in displaying only the contextual semantic data associated with the domain related to lens 504 (i.e., contextual semantic data 505). From the position indicated by bezel 521, the lens 504 is rotated (e.g., by way of bezel 521) in a direction indicated by arrow 523 to another position indicated by bezel 525 of lens 506. Rotation to the position indicated by bezel 525 results in displaying only the contextual semantic data associated with the domain related to lens 506 (i.e., contextual semantic data 507/509). From the position indicated by bezel 525, the lens 506 is rotated (e.g., by way of bezel 525) in a direction indicated by arrow 527 to another position indicated by bezel 529 of lens 508. Rotation to the position indicated by bezel 529 results in displaying only the contextual semantic data associated with the domain related to lens 508 (i.e., contextual semantic data 511/513/515). From the position indicated by bezel 529, the lens 508 is rotated (e.g., by way of bezel 529) in a direction indicated by arrow 531 to another position indicated by bezel 533 of the plurality of stacked lenses 510, (representing the stacking of lenses 504, 506, 508), where all lenses are again revealed and similar to the plurality of stacked lenses 502, the plurality of stacked lenses 510 includes the plurality of contextual semantic data 505, 507, 509, 511, 513, 515 corresponding to the plurality of domains associated with all of the stacked lenses 504, 506, 508. Further, in various embodiments, the position indicated by bezel 533 for the plurality of stacked lenses 510 is equivalent to the first position of the plurality of stacked lenses 502, as indicated by bezel 517.

Also, the ellipsis 537 is shown to indicate additional steps that may be inserted into the sequence of events represented by method 500, for example, by the addition of additional rotational positions, among others. Moreover, while the method 500 discussed herein illustrates an example of domain navigation, it will be readily understood that the embodiments discussed above related to FIG. 3 in regard to navigating time can be equally implemented within the context of the example of FIG. 5A. For example in some embodiments, while in a position indicated by bezel 521, which displays only the contextual semantic data associated with the domain related to lens 504 (e.g., contextual semantic data 505), a domain navigation paradigm may be disengaged and a time navigation paradigm may be engaged, such that all the features regarding time navigation discussed with reference to FIG. 3 can now be applied with respect to lens 504.

Furthermore, in other embodiments, method 500 may represent cycling through contextual semantic data of the same domain by way of rotation of an individual lens. For example, consider an example where all the lenses shown in method 500 represent the same lens which is simply oriented in various positions. Thus, taking the example of a transportation network, lens rotation as described above with reference to method 500 may result in cycling through individual contexts such as a road maintenance records/schedule context (e.g., represented by data 505), a transportation alerts/warnings context (e.g., represented by data 507/509), as well as others well known in the art. Moreover, in all embodiments which include two or more stacked lenses described herein and with reference to methods 500/520/540 of FIG. 5 (A-C), it will be understood that individual lenses within the plurality of stacked lenses may each be rotated independently, rather than rotating all stacked lenses simultaneously. For example, one or more lenses in a stack of lenses may maintain a fixed position, while one or more other lenses in the stack of lenses are rotated.

FIG. 5B, which shows method 520, illustrates layering of contextual semantic data by lens rotation, such that lenses 522, 524, 526, 528, 530 represent a sequence of events occurring as a result of lens rotation. For example, a plurality of stacked lenses 522 (representing the stacking of lenses 524, 526, 528) includes a plurality of contextual semantic data 545, 547, 549, 551, 553, 555 corresponding to a plurality of domains associated with each of the stacked lenses 524, 526, 528. The plurality of stacked lenses 522 is oriented in a first position, as indicated by bezel 557. In some embodiments, the plurality of stacked lenses 522 is rotated (e.g., by way of bezel 557) in a direction indicated by arrow 559 to another position indicated by bezel 561 of lens 524. In some embodiments, rotation of the lenses results in concealment or revealing and/or stacking (i.e., layering) of one or more datasets of the plurality of contextual semantic data, which correspond to one or more lenses of the plurality of stacked lenses. Concealing or revealing and/or stacking (i.e., layering) data by lens rotation illustrates an example of cycling through the contextual semantic data. For example, rotation to the position indicated by bezel 561 results in displaying only the contextual semantic data associated with the domain related to lens 524 (i.e., contextual semantic data 545). From the position indicated by bezel 561, the lens 524 is rotated (e.g., by way of bezel 561) in a direction indicated by arrow 563 to another position indicated by bezel 565 of lens 526. In some embodiments, rotation to the position indicated by bezel 565 results in stacking (i.e., layering) of lenses 524, 526 while concealing all other lenses. Thus, rotation to the position indicated by bezel 565 results in displaying the contextual semantic data associated with both the domain related to lens 524 (i.e., contextual semantic data 545) and the domain related to lens 526 (i.e., contextual semantic data 547/549). In some embodiments, as described herein with reference to FIG. 5B, the lens 526 may include reference to one or both of the individual lens 526 and its associated contextual semantic data 547/549, and it may also include reference to the stacked lenses 524, 526 and their associated contextual semantic data 545/547/549. From the position indicated by bezel 565, the lens 526 is rotated (e.g., by way of bezel 565) in a direction indicated by arrow 567 to another position indicated by bezel 569 of lens 528. In some embodiments, rotation to the position indicated by bezel 569 results in stacking (i.e., layering) of lenses 524, 526, 528 while concealing all other lenses. Thus, rotation to the position indicated by bezel 569 results in displaying the contextual semantic data associated with the domain related to lens 524 (i.e., contextual semantic data 545), the domain related to lens 526 (i.e., contextual semantic data 547/549), and the domain related to lens 528 (i.e., contextual semantic data 551/553/555). In some embodiments, as described herein with reference to FIG. 5B, the lens 528 may include reference to one or more of the individual lens 528 and its associated contextual semantic data 551/553/555, and it may also include reference to the stacked lenses 524, 526, 528 and their associated contextual semantic data 545/547/549/551/553/555. From the position indicated by bezel 569, the lens 528 is rotated (e.g., by way of bezel 569) in a direction indicated by arrow 571 to another position indicated by bezel 573 of the plurality of stacked lenses 530, (representing the stacking of lenses 524, 526, 528), where all lenses are again revealed. Similar to the plurality of stacked lenses 522, the plurality of stacked lenses 530 includes the plurality of contextual semantic data 545, 547, 549, 551, 553, 555 corresponding to the plurality of domains associated with all of the stacked lenses 524, 526, 528. Further, in various embodiments, the position indicated by bezel 573 for the plurality of stacked lenses 530 is equivalent to the first position of the plurality of stacked lenses 522, as indicated by bezel 557.

Also, the ellipsis 577 is shown to indicate additional steps that may be inserted into the sequence of events represented by method 520, for example, by the addition of additional rotational positions, among others. Moreover, while the method 520 discussed herein illustrates an example of domain navigation, it will be readily understood that the embodiments discussed above related to FIG. 3 in regard to navigating time can be equally implemented within the context of the example of FIG. 5B. For example in some embodiments, while in a position indicated by bezel 565, which displays the contextual semantic data associated with the domains related to lenses 524, 526 (e.g., contextual semantic data 545/547/549), a domain navigation paradigm may be disengaged and a time navigation paradigm may be engaged, such that all the features regarding time navigation discussed with reference to FIG. 3 can now be applied with respect to lens 526.

Furthermore, in other embodiments, method 520 may represent cycling through and stacking (i.e., layering) contextual semantic data of the same domain by way of rotation of an individual lens. For example, consider an example where all the lenses shown in method 520 represent the same lens which is simply oriented in various positions. Thus, taking the example of a transportation network, lens rotation as described above with reference to method 520 may result in cycling through and stacking (i.e., layering) individual contexts such as a road maintenance records/schedule context (e.g., represented by data 545), a transportation alerts/warnings context (e.g., represented by data 547/549), as well as others, which may be known in the art.

Figure 5C:
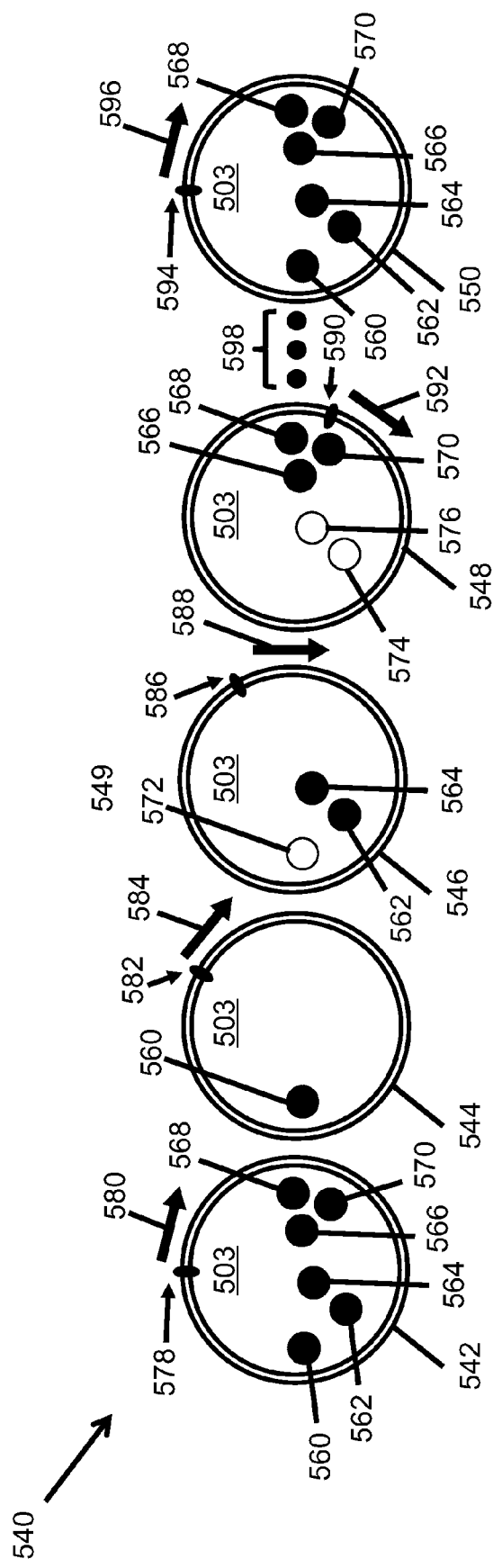

FIG. 5C, showing method 540, illustrates cycling through contextual semantic data by lens rotation and includes a ghosting effect, as described below. Further, lenses 542, 544, 546, 548, 550 represent a sequence of events occurring as a result of lens rotation. For example, a plurality of stacked lenses 542 (representing the stacking of lenses 544, 546, 548) includes a plurality of contextual semantic data 560, 562, 564, 566, 568, 570 corresponding to a plurality of domains associated with each of the stacked lenses 544, 546, 548. The plurality of stacked lenses 542 is oriented in a first position, as indicated by bezel 578. In some embodiments, the plurality of stacked lenses 542 is rotated (e.g., by way of bezel 578) in a direction indicated by arrow 580 to another position indicated by bezel 582 of lens 544. In some embodiments, rotation of the lenses results in concealment or revealing and/or stacking (i.e., layering) of one or more datasets of the plurality of contextual semantic data which correspond to one or more lenses of the plurality of stacked lenses. As shown in FIG. 5C, one or more of the stacked datasets may include ghosted images of datasets. Concealing or revealing and/or stacking (i.e., layering) data by lens rotation, including ghosted images of datasets, illustrates an example of cycling through the contextual semantic data. For example, rotation to the position indicated by bezel 582 results in displaying only the contextual semantic data associated with the domain related to lens 544 (i.e., contextual semantic data 560). From the position indicated by bezel 582, the lens 544 is rotated (e.g., by way of bezel 582) in a direction indicated by arrow 584 to another position indicated by bezel 586 of lens 546. In some embodiments, rotation to the position indicated by bezel 586 results in stacking (i.e., layering) of lenses 544, 546 while concealing all other lenses. Moreover, rotation to the position indicated by bezel 586 results in displaying the contextual semantic data associated with the domain related to lens 546 (i.e., contextual semantic data 562/564) and a ghosted image 572 of the contextual semantic data associated with the domain related to lens 544 (i.e., contextual semantic data 560). In some embodiments, the ghosting effect may be used during domain navigation, as in the example described above, where the ghosted image corresponds to the most recent previously displayed domain. In other embodiments, the ghosting effect may be used during time navigation, where one or more domains (i.e., lenses) are displayed, and the ghosted images of the of the contextual semantic data which are displayed simultaneously with non-ghosted images of contextual semantic data allow for simultaneous visualization of events that occurred at different times, thus improving trend analysis and anomaly detection. Further, in some embodiments during time navigation, the ghosted image of the semantic data will fade out as the time distance between the current time and a time corresponding to when the event represented by the ghosted image first happened increases.

From the position indicated by bezel 586, the lens 546 is rotated (e.g., by way of bezel 586) in a direction indicated by arrow 588 to another position indicated by bezel 590 of lens 548. In some embodiments, rotation to the position indicated by bezel 590 results in stacking (i.e., layering) of lenses 546, 548 while concealing all other lenses. Moreover, rotation to the position indicated by bezel 590 results in displaying the contextual semantic data associated with the domain related to lens 548 (i.e., contextual semantic data 566/568/570) and ghosted images 574/576 of the contextual semantic data associated with the domain related to lens 546 (i.e., contextual semantic data 562/564). From the position indicated by bezel 590, the lens 548 is rotated (e.g., by way of bezel 590) in a direction indicated by arrow 592 to another position indicated by bezel 594 of the plurality of stacked lenses 550, (representing the stacking of lenses 544, 546, 548), where all lenses are again revealed, without further ghosted images. Similar to the plurality of stacked lenses 542, the plurality of stacked lenses 550 includes the plurality of contextual semantic data 560, 562, 564, 566, 568, 570 corresponding to the plurality of domains associated with all of the stacked lenses 544, 546, 548. Further, in various embodiments, the position indicated by bezel 594 for the plurality of stacked lenses 550 is equivalent to the first position of the plurality of stacked lenses 542, as indicated by bezel 578.

In addition, the ellipsis 598 is shown to indicate additional steps that may be inserted into the sequence of events represented by method 540, for example, by the addition of additional rotational positions, among others. Moreover, while the method 540 discussed herein illustrates an example of domain navigation, it will be readily understood that the embodiments discussed above related to FIG. 3 in regard to navigating time can be equally implemented within the context of the example of FIG. 5C.

Furthermore, in other embodiments, method 540 may represent cycling through and stacking (i.e., layering) contextual semantic data, including a ghosting effect, of the same domain by way of rotation of an individual lens. For example, consider an example where all the lenses shown in method 540 represent the same lens which is simply oriented in various positions. Thus, taking the example of a transportation network, lens rotation as described above with reference to method 540 may result in cycling through and stacking (i.e., layering) individual contexts, such as a road maintenance records/schedule context (e.g., represented by data 562/564), and a ghosted image of a transportation alerts/warnings context (e.g., represented by data 572), as well as others.

Figure 6B:
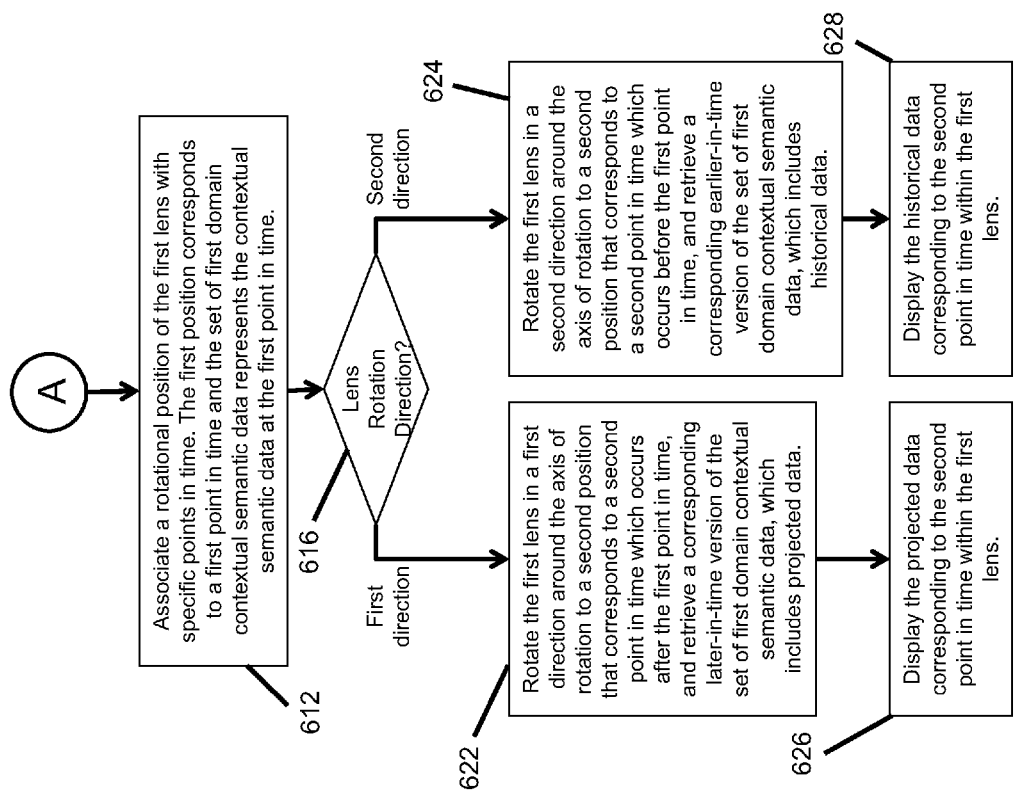

FIGS. 6A-6B is a flow chart illustrating the method for visually navigating contextual semantic data in a lens, in accordance with one embodiment. Computer implemented method 600 can be implemented in DPS 100 or in DPS 100 in conjunction with DPS 102 and network 141, for example, by providing computer program instructions to a processor of DPS 100 or DPS 102 for execution of the program instructions to perform functions related to the visual navigation of contextual semantic data within one or more lenses, as described herein with reference to the method 600.

Method 600 starts with the overlay of a first lens corresponding to a first domain on a graphical overlay (block 602), which includes a spatial rendering of data including one of a geospatial map, a logical map, and a system map. The first domain includes a set of first domain contextual semantic data, and the first lens is oriented in a first position. In some embodiments, the first domain corresponds to one of a water network, a public safety network, a sewer network, a transportation network, a social services network, an emergency management network, and an energy network. An option to monitor temporal changes within the contextual semantic data (i.e., navigate time) is presented (decision block 604). In some embodiments, if temporal changes are not monitored, then the set of first domain contextual semantic data is displayed within the first lens (block 606). Further, the set of first domain contextual semantic data corresponds to a first position. The first lens is rotated around an axis of rotation until the first lens is oriented in a second position (block 608). In response to rotating the first lens around the axis of rotation, the set of first domain contextual semantic data is reconfigured to provide a modified set of first domain contextual semantic data (block 610). An option to activate ghosting of the contextual semantic data is presented (decision block 614). In some embodiments, if ghosting is not activated, the modified set of first domain contextual semantic data is displayed within the first lens (block 618). Moreover, the modified set of first domain contextual semantic data corresponds to the second position. In other embodiments, if ghosting is activated, the modified set of first domain contextual semantic data corresponding to the second position, and a ghosted image of the set of first domain contextual semantic data corresponding to the first position are simultaneously displayed (block 620), for example in the first lens. In other embodiments, if temporal changes are monitored, a rotational position of the first lens is associated with specific points in time (block 612). For example, the first position may correspond to a first point in time and the set of first domain contextual semantic data represents the contextual semantic data at the first point in time. One of two lens rotation directions is selected (block 616). In some embodiments, the first lens is rotated in a first direction (e.g., a clockwise direction) around the axis of rotation to a second position that corresponds to a second point in time which occurs after the first point in time, and where a corresponding later-in-time version of the set of first domain contextual semantic data is retrieved (block 622). In some embodiments, the later-in-time version of the set of first domain contextual semantic data includes projected data. The projected data corresponding to the second point in time is thus displayed within the first lens (block 626). In other embodiments, the first lens is rotated in a second direction (e.g., a counter-clockwise direction) around the axis of rotation to a second position that corresponds to a second point in time which occurs before the first point in time, and where a corresponding earlier-in-time version of the set of first domain contextual semantic data is retrieved (block 624). In some embodiments, the earlier-in-time version of the set of first domain contextual semantic data includes historical data. The historical data corresponding to the second point in time is thus displayed within the first lens (block 628).

Figure 7A:
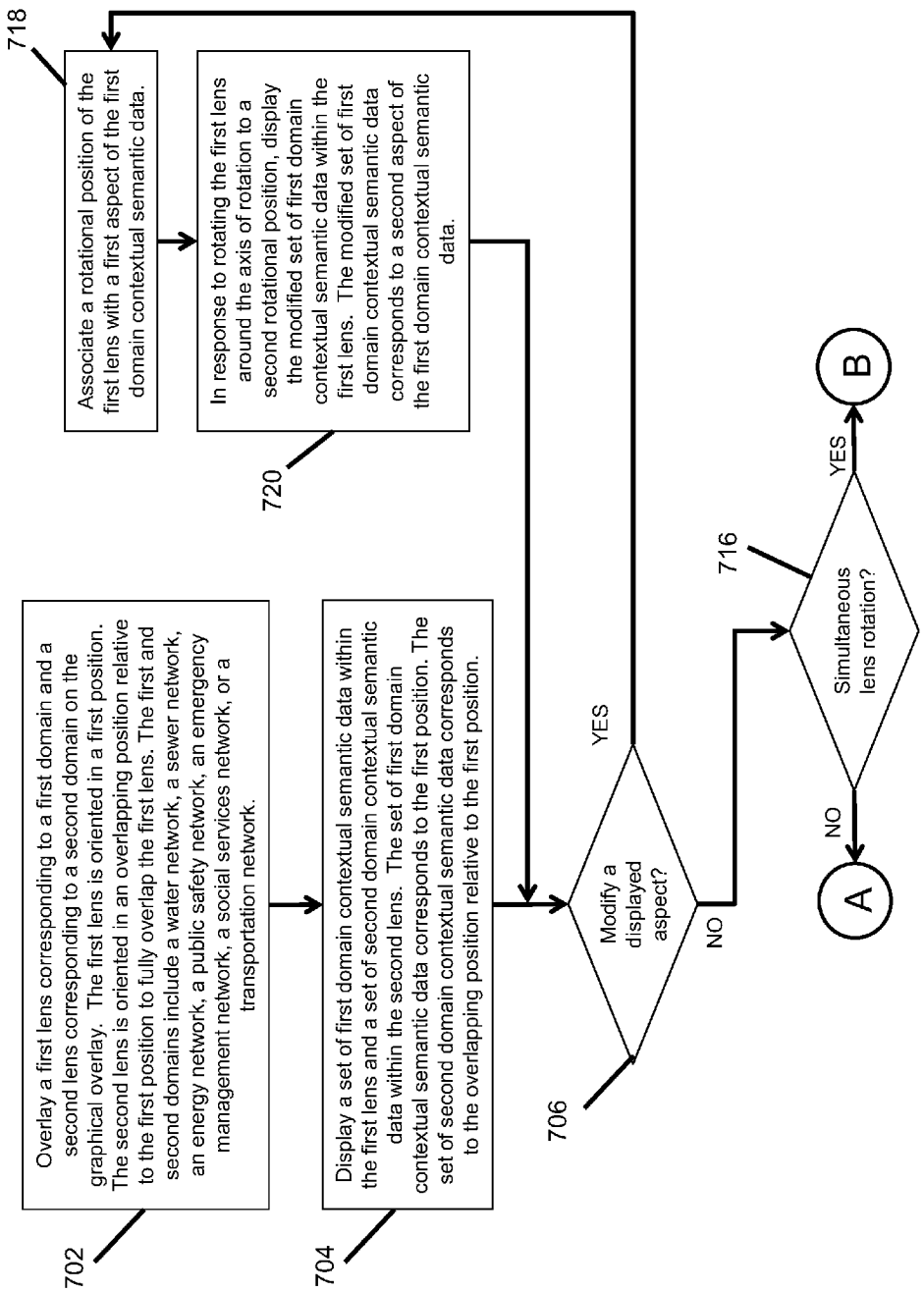

FIG. 7 is a flow chart illustrating the method for visually navigating contextual semantic data in a plurality of lenses, in accordance with one embodiment. Computer implemented method 700 can be implemented in DPS 100 or in DPS 100 in conjunction with DPS 102 and network 141. The method 700 can be implemented, for example, by providing computer program instructions to a processor of DPS 100 or DPS 102 for execution of the program instructions to perform functions related to the visual navigation of contextual semantic data within one or more lenses, as described herein with reference to the method 700.

Method 700 starts with the overlay of a first lens corresponding to a first domain and a second lens corresponding to a second domain on a graphical overlay (block 702), which includes a spatial rendering of data including one of a geospatial map, a logical map, and a system map. The first domain includes a set of first domain contextual semantic data, and the first lens is oriented in a first position. The second domain includes a set of second domain contextual semantic data, and the second lens is oriented in an overlapping position relative to the first position to fully overlap the first lens. In some embodiments, the first and second domains corresponds to one of a water network, a public safety network, a sewer network, a transportation network, a social services network, an emergency management network, and an energy network, among others. The set of first domain contextual semantic data is displayed within the first lens and the set of second domain contextual semantic data is displayed within the second lens (block 704). The set of first domain contextual semantic data corresponds to the first position, and the set of second domain contextual semantic data corresponds to the overlapping position relative to the first position. An option to modify a displayed context aspect is presented (decision block 706). In some embodiments, the displayed context aspect changed, and a rotational position of the first lens is associated with a first aspect of the first domain contextual semantic data (block 718). In response to rotation of the first lens around the axis of rotation to a second rotational position, the modified set of first domain contextual semantic data is displayed within the first lens (block 720). The modified set of first domain contextual semantic data corresponds to a second aspect of the first domain contextual semantic data. In other embodiments, the displayed context is not changed, and an option for simultaneous rotation of the first and second lenses is presented (decision block 716). In some embodiments, if the first and second lenses are chosen not to be simultaneously rotated, then the first lens is rotated around the axis of rotation, while maintaining the second lens in a fixed position. The first lens is rotated until the first lens is oriented in a second position. The second lens is separately rotated around the axis of rotation until the second lens is oriented in an overlapping position relative to the second position to fully overlap the first lens (block 708). The set of first domain contextual semantic data and the set of second domain contextual semantic data are reconfigured to provide a modified set of first domain contextual semantic data and a modified set of second domain contextual semantic data (block 710). Thus, the modified set of first domain contextual semantic data is displayed within the first lens while the modified set of second domain contextual semantic data is simultaneously displayed within the second lens (block 712). The modified set of first domain contextual semantic data corresponds to the second position, and the modified set of second domain contextual semantic data corresponds to the overlapping position relative to the second position. By simultaneously displaying the first and second domain contextual semantic data, a cross-domain interaction between the first domain and the second domain can be identified based on patterns of semantic data between the first and second sets of contextual semantic data in response to rotating the second lens (block 714). In response to identifying the cross-domain interaction between the first and second domains, an icon may be overlaid on the graphical overlay. In some embodiments, when the option for simultaneous lens rotation is presented (decision block 716), an election can be made to simultaneously rotate the lenses. Thus the first lens and the second lens are simultaneously rotated around the axis of rotation until the first lens is oriented in a second position and until the second lens is oriented in an overlapping position relative to the second position to fully overlap the first lens (block 724). As a result, the set of first domain contextual semantic data and the set of second domain contextual semantic data are simultaneously reconfigured to provide a modified set of first domain contextual semantic data and a modified set of second domain contextual semantic data (block 726). The method 700 then proceeds to simultaneously display the modified sets of first and second domain contextual semantic data (block 712), and in some embodiments, a cross-domain interaction between the first domain and the second domain can be identified (block 714).

Figure 8:
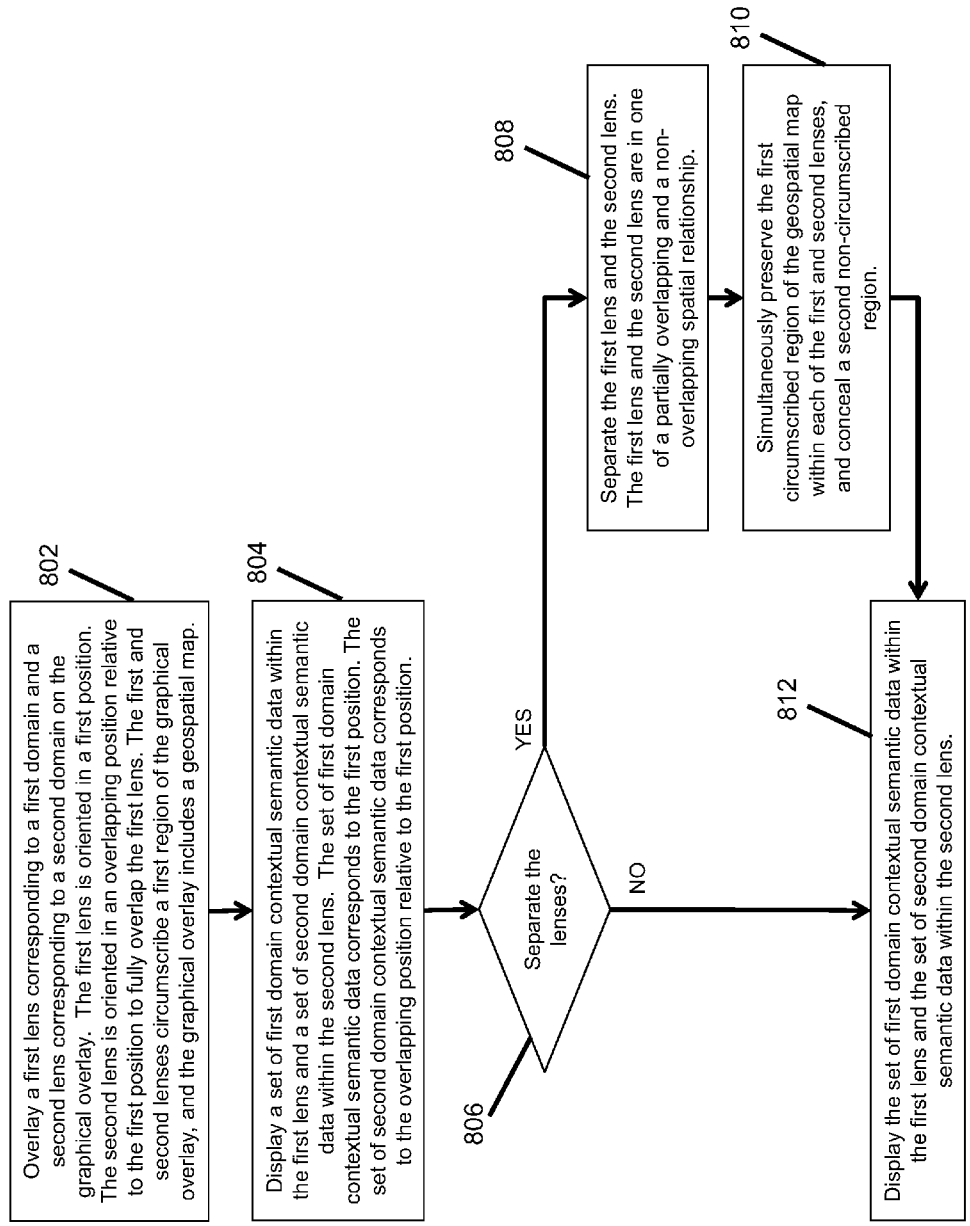
FIG. 8 is a flow chart illustrating a method for visually navigating contextual semantic data for a fixed region of a graphical overlay across a plurality of domains in a plurality of lenses in accordance with various embodiments.

FIG. 8 is a flow chart illustrating the method for visually navigating contextual semantic data for a fixed region of a graphical overlay across a plurality of domains in a plurality of lenses, in accordance with various embodiments. Computer implemented method 800 can be implemented in DPS 100 or in DPS 100 in conjunction with DPS 102 and network 141, for example, by providing computer program instructions to a processor of DPS 100 or DPS 102 for execution of the program instructions to perform functions related to the visual navigation of contextual semantic data within one or more lenses, as described herein with reference to the method 800.

Method 800 starts with the overlay of a first lens corresponding to a first domain and a second lens corresponding to a second domain on a graphical overlay (block 802), which includes a spatial rendering of data including one of a geospatial map, a logical map, and a system map. The first domain includes a set of first domain contextual semantic data, and the first lens is oriented in a first position. The second domain includes a set of second domain contextual semantic data, and the second lens is oriented in an overlapping position relative to the first position to fully overlap the first lens. Moreover, the first and second lenses circumscribe a first region of the graphical overlay (i.e., a first region of the geospatial map). The set of first domain contextual semantic data is displayed within the first lens and the set of second domain contextual semantic data is displayed within the second lens (block 804). The set of first domain contextual semantic data corresponds to the first position, and the set of second domain contextual semantic data corresponds to the overlapping position relative to the first position. An option to pull apart (i.e., to separate) the first and second lenses is presented (decision block 806), for example to allow for investigation of the circumscribed first region through inspection of a single domain (i.e., a single lens). In some embodiments, if the first and second lenses are elected not to be separated, then the set of first domain contextual semantic data is displayed within the first lens and the set of second domain contextual semantic data is displayed within the second lens (block 812), for example, while the second lens remains oriented in a fully overlapping position relative to the first lens. In other embodiments, the first and second lenses are separated and are thus in one of a partially overlapping and non-overlapping spatial relationship (block 808). Separation of the first and second lenses results in simultaneous preservation of the first circumscribed region of the graphical overlay (i.e., the first region of the geospatial map) within each of the first and second lenses (block 810). In addition, in some embodiments, any non-circumscribed region of the graphical overlay may be concealed. After separation of the first and second lenses, the set of first domain contextual semantic data is displayed within the first lens and the set of second domain contextual semantic data is displayed within the second lens (block 812), for example, while the first and second lens are in one of a partially overlapping and non-overlapping spatial relationship.

In each of the flow charts above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

As will be appreciated by one skilled in the art, aspects of the present disclosure may be embodied as a system, method or computer program product. Accordingly, aspects of the present disclosure may take the form of an entirely hardware embodiment or an embodiment combining software (including, for example, firmware, resident software, micro-code, etc.) and hardware aspects that may all generally be referred to herein as a "circuit," "module" or "system." Furthermore, aspects of the present disclosure may take the form of a computer program product embodied in one or more computer readable storage devices or other computer readable medium(s) having computer readable program code embodied thereon.

Any combination of one or more computer readable medium(s) may be utilized. The computer readable medium may be a computer readable signal medium or a computer readable storage device. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage device and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can configure a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the disclosure may be practiced by combining one or more machine-readable storage devices containing the code according to the present disclosure with appropriate processing hardware to execute the code contained therein. An apparatus for practicing the disclosure could be one or more processing devices and storage systems containing or having network access to program(s) coded in accordance with the disclosure.

Thus, it is important that while an illustrative embodiment of the present disclosure is described in the context of a fully functional computer (server) system with installed (or executed) software, those skilled in the art will appreciate that the software aspects of an illustrative embodiment of the present disclosure are capable of being distributed as a program product in a variety of forms, and that an illustrative embodiment of the present disclosure applies equally regardless of the particular type of media used to actually carry out the distribution.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

While particular embodiments of the present disclosure have been shown and described, it will be obvious to those skilled in the art that, based upon the teachings herein, changes and modifications may be made without departing from this disclosure and its broader aspects. Consequently, the appended claims are to encompass within their scope all such changes and modifications as are within the true spirit and scope of this disclosure and embodiments of the disclosure are intended to be limited only by the scope of the appended claims, giving full cognizance to equivalents in all respects.

What is claimed is:

1. A computer implemented method of visually navigating contextual semantic data in a graphical overlay, the method comprising:
    overlaying a first lens on the graphical overlay, wherein the first lens corresponds to a first domain including a set of first domain contextual semantic data, and wherein the first lens is oriented in a first position;
    displaying the set of first domain contextual semantic data within the first lens, wherein the set of first domain contextual semantic data corresponds to the first position;
    rotating the first lens around an axis of rotation until the first lens is oriented in a second position;
    responsive to rotating the first lens around the axis of rotation, reconfiguring the set of first domain contextual semantic data to provide a modified set of first domain contextual semantic data; and
    displaying the modified set of first domain contextual semantic data within the first lens, wherein the modified set of first domain contextual semantic data corresponds to the second position.

2. The method of claim 1, further comprising: while the first lens is oriented in the second position, simultaneously displaying the modified set of first domain contextual semantic data corresponding to the second position and a ghosted image of the set of first domain contextual semantic data corresponding to the first position.

3. The method of claim 1, further comprising:
    associating a rotational position of the first lens with a first aspect of the first domain contextual semantic data; and
    responsive to rotating the first lens around the axis of rotation to a second rotational position, displaying the modified set of first domain contextual semantic data within the first lens, wherein the modified set of first domain contextual semantic data corresponds to a second aspect of the first domain contextual semantic data.

4. The method of claim 1, further comprising:
    associating a rotational position of the first lens with specific points in time, wherein the first position corresponds to a first point in time and the set of first domain contextual semantic data represents the contextual semantic data at the first point in time;
    responsive to rotating the first lens in a first direction around the axis of rotation, to a second position that corresponds to a second point in time occurring after the first point in time, retrieving a corresponding later-in-time version of the set of first domain contextual semantic data, wherein the later-in-time version of the set of first domain contextual semantic data corresponding to the second position comprises projected data; and
    displaying the projected data corresponding to the second point in time within the first lens.

5. The method of claim 1, further comprising:
    associating a rotational position of the first lens with specific points in time, wherein the first position corresponds to a first point in time and the set of first domain contextual semantic data represents the contextual semantic data at the first point in time;
    responsive to rotating the first lens in a second direction around the axis of rotation, to a second position that corresponds to a second point in time occurring before the first point in time, retrieving a corresponding earlier-in-time version of the set of first domain contextual semantic data, wherein the earlier-in-time version of the set of first domain contextual semantic data corresponding to the second position comprises historical data; and
    displaying the historical data corresponding to the second point in time within the first lens.

6. The method of claim 1, wherein the first domain comprises a network selected from a group comprising: a water network; a sewer network; an energy network; a public safety network; an emergency management network; a social services network; and a transportation network.

7. The method of claim 1, further comprising:
    overlaying a second lens on the graphical overlay, wherein the second lens corresponds to a second domain including a set of second domain contextual semantic data, and wherein the second lens is oriented in an overlapping position relative to the first position to fully overlap the first lens; and
    displaying the set of second domain contextual semantic data within the second lens, wherein the set of second domain contextual semantic data corresponds to the overlapping position relative to the first position.

8. The method of claim 7, further comprising:
    rotating the second lens around the axis of rotation until the second lens is oriented in an overlapping position relative to the second position to fully overlap the first lens; and
    while the second lens is oriented in the overlapping position relative to the second position, simultaneously displaying (i) a reconfigured set of second domain contextual semantic data corresponding to the overlapping position relative to the second position and (ii) a ghosted image of the set of second domain contextual semantic data corresponding to the overlapping position relative to the first position.

9. The method of claim 7, further comprising:
    responsive to simultaneously rotating the first lens and the second lens around the axis of rotation, simultaneously reconfiguring the set of first domain contextual semantic data and the set of second domain contextual semantic data; and responsive to rotating the first lens around the axis of rotation, while maintaining the second lens in a fixed position, reconfiguring the set of first domain contextual semantic data.

10. The method of claim 8, further comprising:
responsive to rotating the second lens around the axis of rotation, identifying a cross-domain interaction between the first domain and the second domain, based on patterns of semantic data between the first and second sets of contextual semantic data; and
overlaying an icon on the graphical overlay corresponding to the cross-domain interaction.

11. The method of claim 7, further comprising:
circumscribing a first region of the graphical overlay within each of the first lens and the second lens, wherein the graphical overlay comprises a geospatial map;
separating the first lens and the second lens, wherein the first lens and the second lens are in one of a partially overlapping and a non-overlapping spatial relationship;
in response to separating the first lens and the second lens, simultaneously preserving the first circumscribed region of the geospatial map within each of the first and second lenses, and concealing a second non-circumscribed region; and
displaying the set of first domain contextual semantic data within the first lens and the set of second domain contextual semantic data within the second lens.

12. A data processing system comprising:
at least one storage device having a set of instructions located therein; and
at least one processor in communication with the at least one storage device, the at least one processor operable to execute the set of instructions which cause the at least one processor to:
overlay a first lens on a graphical overlay, wherein the first lens corresponds to a first domain including a set of first domain contextual semantic data, and wherein the first lens is oriented in a first position;
display the set of first domain contextual semantic data within the first lens, wherein the set of first domain contextual semantic data corresponds to the first position;
rotate the first lens around an axis of rotation until the first lens is oriented in a second position;
responsive to the rotation of the first lens around the axis of rotation, reconfigure the set of first domain contextual semantic data to provide a modified set of first domain contextual semantic data; and
display the modified set of first domain contextual semantic data within the first lens, wherein the modified set of first domain contextual semantic data corresponds to the second position.

13. The data processing system of claim 12, further comprising instructions that cause the processor to, while the first lens is oriented in the second position, simultaneously display the modified set of first domain contextual semantic data corresponding to the second position and a ghosted image of the set of first domain contextual semantic data corresponding to the first position.

14. The data processing system of claim 12, further comprising instructions that cause the processor to:
associate a rotational position of the first lens with specific points in time, wherein the first position corresponds to a first point in time and the set of first domain contextual semantic data represents the contextual semantic data at the first point in time;
responsive to the rotation of the first lens in a first direction around the axis of rotation, to a second position that corresponds to a second point in time occurring after the first point in time, display a corresponding later-in-time version of the set of first domain contextual semantic data within the first lens, wherein the later-in-time version of the set of first domain contextual semantic data corresponding to the second position includes projected data; and
responsive to the rotation of the first lens in a second direction around the axis of rotation, to a second position that corresponds to a second point in time occurring before the first point in time, display a corresponding earlier-in-time version of the set of first domain contextual semantic data within the first lens, wherein the earlier-in-time version of the set of first domain contextual semantic data corresponding to the second position includes historical data.

15. The data processing system of claim 12, further comprising instructions that cause the processor to:
overlay a second lens on the graphical overlay, wherein the second lens corresponds to a second domain including a set of second domain contextual semantic data, and wherein the second lens is oriented in an overlapping position relative to the first position to fully overlap the first lens; and
display the set of second domain contextual semantic data within the second lens, wherein the set of second domain contextual semantic data corresponds to the overlapping position relative to the first position.

16. The data processing system of claim 15, further comprising instructions that cause the processor to:
rotate the second lens around the axis of rotation until the second lens is oriented in an overlapping position relative to the second position to fully overlap the first lens; and
while the second lens is oriented in the overlapping position relative to the second position, simultaneously display (i) a reconfigured set of second domain contextual semantic data corresponding to the overlapping position relative to the second position and a ghosted image of the set of second domain contextual semantic data corresponding to the overlapping position relative to the first position.

17. The data processing system of claim 15, further comprising instructions that cause the processor to:
circumscribe a first region on the graphical overlay within each of the first lens and the second lens, wherein the graphical overlay includes a geospatial map;
separate the first lens and the second lens, wherein the first lens and the second lens are in one of a partially overlapping and a non-overlapping spatial relationship;
in response to the separation of the first lens and the second lens, simultaneously preserve the first circumscribed region of the geospatial map within each of the first and second lenses, and conceal a second non-circumscribed region; and
display the set of first domain contextual semantic data within the first lens and the set of second domain contextual semantic data within the second lens.

18. A computer program product comprising:
a computer readable storage device; and
program code on the computer readable storage device that when executed within a data processing device, the program code provides the functionality of:
overlaying a first lens on the graphical overlay, wherein the first lens corresponds to a first domain including a set of first domain contextual semantic data, and wherein the first lens is oriented in a first position;

displaying the set of first domain contextual semantic data within the first lens, wherein the set of first domain contextual semantic data corresponds to the first position;

rotating the first lens around an axis of rotation until the first lens is oriented in a second position;

responsive to rotating the first lens around the axis of rotation, reconfiguring the set of first domain contextual semantic data to provide a modified set of first domain contextual semantic data; and displaying the modified set of first domain contextual semantic data within the first lens, wherein the modified set of first domain contextual semantic data corresponds to the second position.

19. The computer program product of claim 18, further comprising program code that when executed within the data processing device, the program code provides the functionality of:

overlaying a second lens on the graphical overlay, wherein the second lens corresponds to a second domain including a set of second domain contextual data, and wherein the second lens is oriented in an overlapping position relative to the first position to fully overlap the first lens; and displaying the set of second domain contextual semantic data within the second lens, wherein the set of second domain contextual semantic data corresponds to the overlapping position relative to the first position.

20. The computer program product of claim 19, further comprising program code that when executed within the data processing device, the program code provides the functionality of:

circumscribing a first region of the graphical overlay within each of the first lens and the second lens, wherein the graphical overlay comprises a geospatial map;

separating the first lens and the second lens, wherein the first lens and the second lens are in one of a partially overlapping and a non-overlapping spatial relationship;

in response to separating the first lens and the second lens, simultaneously preserving the first circumscribed region of the geospatial map within each of the first and second lenses, and concealing a second non-circumscribed region; and displaying the set of first domain contextual semantic data within the first lens and the set of second domain contextual semantic data within the second lens.

* * * * *